Patented Sept. 22, 1953

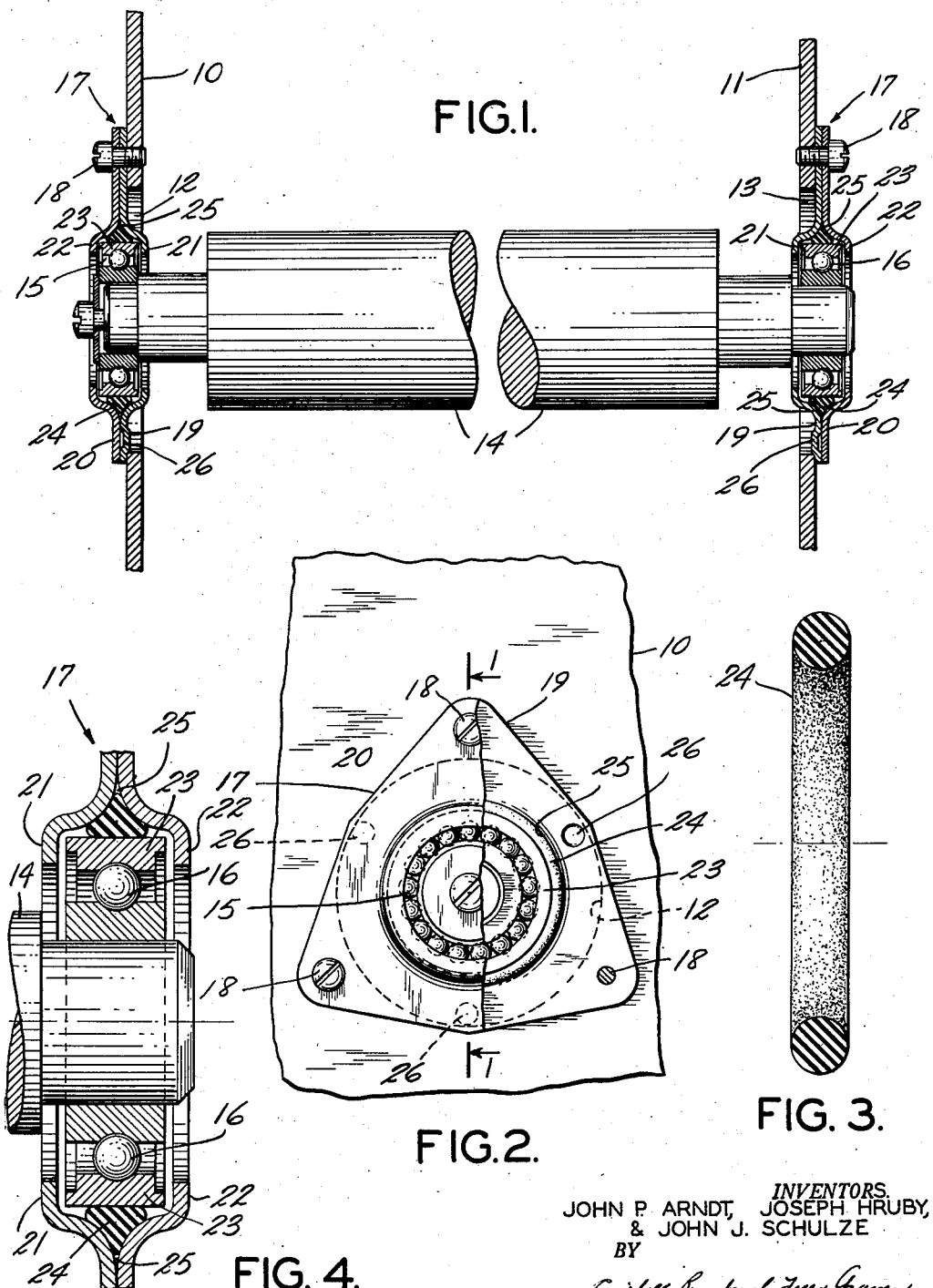

2,653,063

UNITED STATES PATENT OFFICE 2,653,063

RESILIENT BEARING MOUNTING

John P. Arndt, Oak Park, Joseph Hruby, Deerfield, and John J. Schulze, Prospect Heights, Ill., assignors to Charles Bruning Company, Inc., New York, N. Y., a corporation of New York Application February 15, 1951, Serial No. 211,048

4 Claims. (Cl. 308—184)

1

The present invention relates to bearing structures wherein a rotatable member is journaled in an antifriction bearing, such as a ball bearing, and wherein the ball bearing is removably mounted within a housing or other suitable supporting structure.

The present invention is an improvement over that set forth in the pending application for United States Letters Patent bearing Serial No. 719,547 in the name of Joseph Hruby for "Resilient Mounting for Ball Bearing."

In the machines, such as developing and printing machines for light-sensitive papers (such as blueprint, diazo, and similar types of papers), it is important to mount rolls therein in such fashion that the rolls may be accurately positioned and yet maintained with facility for ready removal while being secured in a desired operating position in such antifriction bearings. In order that rotatable elements, such as the foregoing, may be secured removably, the present invention has been designed, and an object thereof is to provide removable bearing mountings by means of which a rotatable member carried by an antifriction bearing may be assembled and disassembled in a desired machine structure without the necessity of dismantling substantial portions of the machine.

A further object of the invention is to provide a removable bearing of the above character wherein the mounting structure therefor not only permits removal of the bearing from the machine, but also facilitates the removal of the roll or other structure carried by the bearing.

The structure by means of which the foregoing is accomplished is illustrated in the accompanying drawings, wherein:

Figure 1 is a view in front elevation of a roll and bearing mounting therefor, the bearing and bearing mounting being illustrated in section, on the line indicated at 1—1 in Figure 2;

Figure 2 is a partial view in end elevation, partly broken away and in section, showing the bearing mounting structure of Figure 1;

Figure 3 is an enlarged view in section showing the mounting ring in its normal condition; and Figure 4 is an enlarged view, similar to Figure 1, showing the conformation of the mounting ring in its assembled position.

With reference to the above drawings, the side walls of a machine, such as a printing or developing machine, are indicated at 10 and 11, and are provided with openings 12 and 13, respectively. A roll 14 is adapted to be mounted

2 between the side walls 10 and 11 and supported in antifriction bearings 15 and 16. The structure of the roll and of the bearings 15 and 16 forms no part of the present invention and, therefore, these elements need not be dealt with in greater detail.

In accordance with the present invention, it is proposed to mount the roll and bearing structure in the side walls 10 and 11 so that they may be conveniently removed therefrom and, at the same time, so that these elements may be readily assembled in their operative position, as illustrated in Figure 1. In order that this may be accomplished, the bearings are secured yieldingly in removable bearing brackets indicated generally at 17, these bearing brackets being secured to the side walls 10 and 11 by means of screws 18.

Each bracket is formed of an inner plate 19 and a mating outer plate 20 through which the screws 18 extend, as illustrated in Figure 1. The plates 19 and 20 are formed with offset flanges 21 and 22, respectively, within which the outer race 23 of the bearings 15 and 16 are received. In order that the bearings may be resiliently mounted within the mounting plate 17, a ring of rubber 24 is received within a V-shaped channel 25 formed by the converging portions of the plates 19 and 20. The rubber ring 24 engages the outer surfaces of the outer races 23 and thus supports the bearings yieldingly in the mounting plate 17 with sufficient clearance to permit movement of the bearing to enable it to assume a required position of alignment. Locating lugs 26 are formed on the inner plate 19 and so positioned as to engage the walls of the respective openings 12 and 13 (as illustrated in Figure 2), so that the mounting plate 17 may be effectively and conveniently secured in the desired position for properly locating the roll 14 in its operative position.

It will be observed that the resilient ring 24 thus serves to cause the bearings to be self-aligning and self-adjusting. Moreover, it will be seen that the roll 14 may be quickly removed from the machine by dismounting the plates 17 and the bearings 15 and 16, and after removal of one of the brackets 17, the roll 14 may be removed through the appropriate openings 12 or 13. In assembling the structure, the end of the roll is inserted in the appropriate bearing 15 or 16, which is mounted in one of the brackets 17 that is secured to the appropriate side wall of the machine, and then the other bracket assembly is assembled, inserted over the end of the roll 14, and secured in position by means of the screws 18. The plates 19 and 20 thus can be formed in a simple punching operation, and the requirements of precision in the manufacture of the foregoing mechanism are thus relaxed.

While the invention has been described with specific reference to the accompanying drawings, it is not to be limited save as defined in the appended claims.

We claim:

1. A self-aligning bearing mounting for a rotatable member, such as a roll, comprising an anti-friction bearing, inner and outer plates having spaced flanges between which the sides of said bearing are loosely received, and a ring of resilient material compressed between said flanges and surrounding the circumference of said bearing for resiliently securing said bearing.

2. In a machine having a rotatable member adapted to be mounted through an aperture in a supporting wall, a self-aligning bearing mounting comprising an anti-friction bearing for the rotatable member, inner and outer plates having spaced flanges thereon to receive the sides of the bearing loosely therebetween, a ring of resilient material surrounding the circumference of said bearing, and means for attaching said plates over the aperture in the supporting wall to compress said ring and secure said bearing by its circumference.

3. In combination a rotatable shaft, a supporting wall having an aperture therein larger than the diameter of said shaft and a self-aligning bearing structure including a supporting bracket having inner and outer plates, said inner and outer plates having divergent flanges in cooperative relation forming a recess therebetween, anti-friction bearings having inner and outer bearing rings in cooperative relation, said inner bearing ring being mounted on said rotatable shaft, resilient means for mounting said outer bearing ring within said recess for movement both axial and transverse with respect to the axis of said shaft, said resilient means being compressed between said outer bearing ring and said two flanges, and means for mounting said bracket over said aperture.

4. In combination a rotatable shaft, anti-friction ball bearings, an inner race for said ball bearings mounted on said shaft, an outer race for said ball bearings, a resilient member around the circumference of said outer race, two plates having apertures with divergent flanges forming a recess therebetween for receiving said resilient member and a portion of said outer race, said recess being of greater width than the width of said portion of said outer race received therein so as to permit both axial and transverse movement relative to the axis of the shaft, a support member having an aperture to receive said rotating shaft, said aperture being of greater diameter than the diameter of said rotatable shaft, and means for removably attaching said two plates over the aperture of said support member so as to compress said resilient member and secure said bearing by its circumference.

JOHN P. ARNDT.
JOSEPH HRUBY.
JOHN J. SCHULZE.

References Cited in the file of this patent

UNITED STATES PATENTS

| Number | Name | Date |
|---|---|---|
| 1,908,743 | Farrell | May 16, 1933 |
| 1,980,580 | Gilmore | Nov. 13, 1934 |
| 2,098,073 | Tucker | Nov. 2, 1937 |
| 2,101,346 | Robertson | Dec. 7, 1937 |
| 2,105,437 | Hansen | Jan. 11, 1938 |
| 2,329,151 | Brady | Sept. 7, 1943 |
| 2,469,483 | Strong | May 10, 1949 |

FOREIGN PATENTS

| Number | Country | Date |
|---|---|---|
| 52,311 | Denmark | Oct. 19, 1936 |